United States Patent [19]
Blüml et al.

[11] Patent Number: 5,110,283
[45] Date of Patent: May 5, 1992

[54] INJECTION MOLDING MACHINE HAVING A PRECISION CLAMPING UNIT

[75] Inventors: Hans Blüml, Burgthann; Peter Klein, Schwaig; Ernst Würl, Höttingen, all of Fed. Rep. of Germany

[73] Assignee: Mannesmann AG, Düsseldorf, Fed. Rep. of Germany

[21] Appl. No.: 441,379

[22] Filed: Nov. 27, 1989

Related U.S. Application Data

[63] Continuation-in-part of PCT/DE88/00304, May 19, 1988.

[30] Foreign Application Priority Data

May 27, 1987 [DE] Fed. Rep. of Germany ....... 3718106

[51] Int. Cl.[5] .............................................. B29C 45/66
[52] U.S. Cl. .................................. 425/589; 425/450.1; 425/451.7; 425/451.9; 425/595
[58] Field of Search ............... 425/150, 589, 590, 595, 425/450.1, 451.7, 451.9, 451.2

[56] References Cited

U.S. PATENT DOCUMENTS

| | | | |
|---|---|---|---|
| 2,372,833 | 4/1945 | Jobst | 425/154 |
| 3,208,105 | 9/1965 | White | 425/586 |
| 3,656,877 | 4/1972 | Aoki | 425/590 |
| 4,304,540 | 12/1981 | Hammon | 425/595 |
| 4,380,427 | 4/1983 | Hehl | 425/451.2 |
| 4,545,756 | 10/1985 | Hiroshi et al. | 425/590 |
| 4,622,194 | 11/1986 | Rogers et al. | 264/333 |
| 4,781,568 | 11/1988 | Inaba | 425/451.7 |

*Primary Examiner*—Timothy Heitbrink
*Attorney, Agent, or Firm*—Nils H. Ljungman & Associates

[57] ABSTRACT

A device for precisely aligning, mating and clamping two injection mold plates, in which device, a first mold plate is rigidly attached to a support table and a second mold plate is slidably guided on parallel guide bars into contact with the first mold plate by at least two symmetrically placed, parallel ball spindles which are driven synchronously by a hydraulic motor.

12 Claims, 7 Drawing Sheets

INJECTION MOLDING MACHINE HAVING A PRECISION CLAMPING UNIT

CONTINUING APPLICATION DATA

This application is a continuation-in-part application of International application No. PCT/DE88/00304, filed on May 19, 1988, which claims priority under 35 U.S.C. § 119, from Federal Republic of Germany patent application No. P 37 18 106.8, filed May 27, 1987.

BACKGROUND OF THE INVENTION

1. Field of the Invention

This invention refers to a precision clamping unit for an injection molding machine. The molding machine has a machine bed on which are positioned stationary and sliding guided mod clamping plates and at least one drive for moving and locking the mold clamping plates.

2. Description of the Prior Art

The market volume for precision injection molding components, such as computer peripherals, copying machines, photography equipment, telecommunications equipment and optical storage equipment has recently increased. The machines which are suitable for molding components must possess special characteristics, such as firmness of form with parallelism of the mold clamping guide, as well as firmness of form in areas where only marginal clamping forces are present, as well as to be adapted for precision injection.

Injection molding machines are known where the moveable mold clamping plates are guided by a transom or beam and moved by one or more drives which consist of a servo-motor and a ball spindle or screw drive. This type of machine has replaced the customary movement drives of mold clamping plates which, previously, had toggle joints, hydraulic cylinders, ball spindles and servo-motors because of the precision of movement provided thereby. The disadvantage of such machines, however, is that parallel guidance of the molding clamp plate on a beam is not precise, because the beam sleeve guides cannot be made with acceptable tolerances.

U.S. Pat. No. 3,208,135 discloses an injection molding machine where the mold clamping plate rides on chains operated by hydraulic motors which, in turn, drive screw spindles and associated nuts. This type of drive has play and tolerances which make synchronism impossible.

Another injection molding machine for plastic is disclosed in French Laid Open patent appln. No. 25 16 857. This device has the disadvantage that component forces can be exerted and, if they are higher than the weight of the plate in the device, can lead to vertical disalignment of some of the components of the device.

Another disadvantage of the above-mentioned machines is that the electric drive units which are utilized have small power density and do not permit a compact design of the machine. It was attempted to generate the required higher capacity through the parallel switching of two electro-motors, however, the results were not satisfactory.

OBJECT OF THE INVENTION

It is an object of the present invention to build a precision clamping unit for an injection mold machine which possesses the mechanical prerequisites for a precision injection.

SUMMARY OF THE INVENTION

The present invention provides the combination of two ball spindles together with a precision linear rail guide positioned on a machine bed to guarantee the parallelism and proper mating of both mold plates of a mold during the injection process. By positioning both ball spindles on a horizontal plane and providing a synchronized power drive and precision spindle pitch for the ball spindle, the facing surfaces of the two mold pieces or plates can be kept parallel and proper mating and clamping of the two mold plates can be achieved. A powerful hydraulic motor permits a compact machine construction.

Another preferred embodiment of the invention provides that the precision linear guide, or guide rails, are configured as a linear cradle guide. The area of the footing of the mold clamping plate is dimensional so that four linear cradle elements can be provided.

Additionally, for providing stability of shape, the present invention can be provided with a precision linear guide which is attached to a machine bed which consists of polymer concrete. This type of machine bed has high dampening qualities, high stability of shape and allows for freedom of design.

By using a hydraulic motor as a drive unit, the unit can be switched to operate at least two displacement volumes. By operating it in this manner, the disadvantages of using an electric drive unit can be avoided and the desired kinematic requirements of the moveable mold clamping plate can be achieved. By providing a switchable volume motor, high rotational velocities and torque are provided to allow for the quick movement of the mold and a high mold clamping force.

Another embodiment of the invention provides a mechanical switching gear to the hydraulic motor. The switching gear allows at least two torque and rotational velocities to be obtained. This provides for different movements or power requirements required for the closing and movement of a sliding mold clamping plate. In this embodiment, the switching gear may be formed as a planetary gear which is integrated into the drive design of the ball spindle. For example, the drive could be operated by means of a clogged belt with the planetary gears being built into the clogged belt wheel.

According to another embodiment of the invention, a closed loop servo-valve is provided for quadrant operation of the control of the hydraulic motor. A stepping motor controlled servo-valve, or hydraulic ratio amplifier, may be provided for the control of the hydraulic motor. The latter variation has the advantage that during numeric, or digital control (NC-control) the digital signals can be fed directly to the hydraulic ratio amplifier.

An embodiment of the invention provides that the hydraulic motor is the sole drive unit for the sliding mold clamping plate and that the hydraulic motor is employed as a constant motor with a brake and serves to lock the sliding mold clamping plate to a fixed mold clamping plate with either hydraulic and/or hydraulic operated locking devices. With this configuration, a hydraulic-mechanical clamping unit is attached to each one of the ball spindles on the fixed clamping unit. With this clamping unit, a wedging effect can be achieved to provide an axil clamping force and can be hydraulically generated to provide the necessary clamping force. In this embodiment, the ball spindle serves as the sole drive unit of the sliding mold clamping plate while the clamping unit clamps the two molding plates together, with the required clamping forces, after the ball spindle completes the initial mating of the two mold pieces.

In another embodiment of the invention, a piston and cylinder unit is connected on each end of the ball spindle and is attached to the fixed mold clamping plate. After the initial mating of the two molding plates, the required clamping force is generated. In this embodiment, the clamping power is generated hydraulically by a pressure cushion applied against the ball spindle which operates similar to a draw spindle.

Another embodiment of the invention provides ball spindles which are employed for the purpose of generating the mold clamping force. In this case, the ball spindle acts to move a nut, which is mechanically attached to the moveable mold clamping plate. The ball spindles can be driven by a common hydraulic motor, as described above, in a synchronized manner and a piston and cylinder type unit may be provided for initially moving the two molding plates together over the entire drive stroke.

In this embodiment, a reversal of the previous embodiment of the travel movement is achieved since the piston and cylinder now provide the initial travel of the moveable mold plate and the ball cylinder provides the clamping force. The locking of the mold plates, in this embodiment, is done by means of the ball spindle, which is operated by the hydraulic motor, and nuts, which may take on the form of threaded sleeve inserts which are driven in synchronization, to press together the two mold clamping plates. With this embodiment, an injection molding machine is improved so that precision clamping unit is created with which it is possible to produce mold injected components with a high degree of accuracy because the construction and rigidity of the machine is sufficient to meet the required high demands and tolerances. It is preferable that exact and precise power application to the components of the machine, which is used for the injection process, be made in combination with the torsion resisting machine bed so that moveable parts are guided extremely accurately.

BRIEF DESCRIPTION OF THE DRAWINGS

The following Description of the Preferred Embodiments may be better understood when taken in conjunction with the appended drawings in which.

DESCRIPTION OF THE PREFERRED EMBODIMENTS

Figure 1:
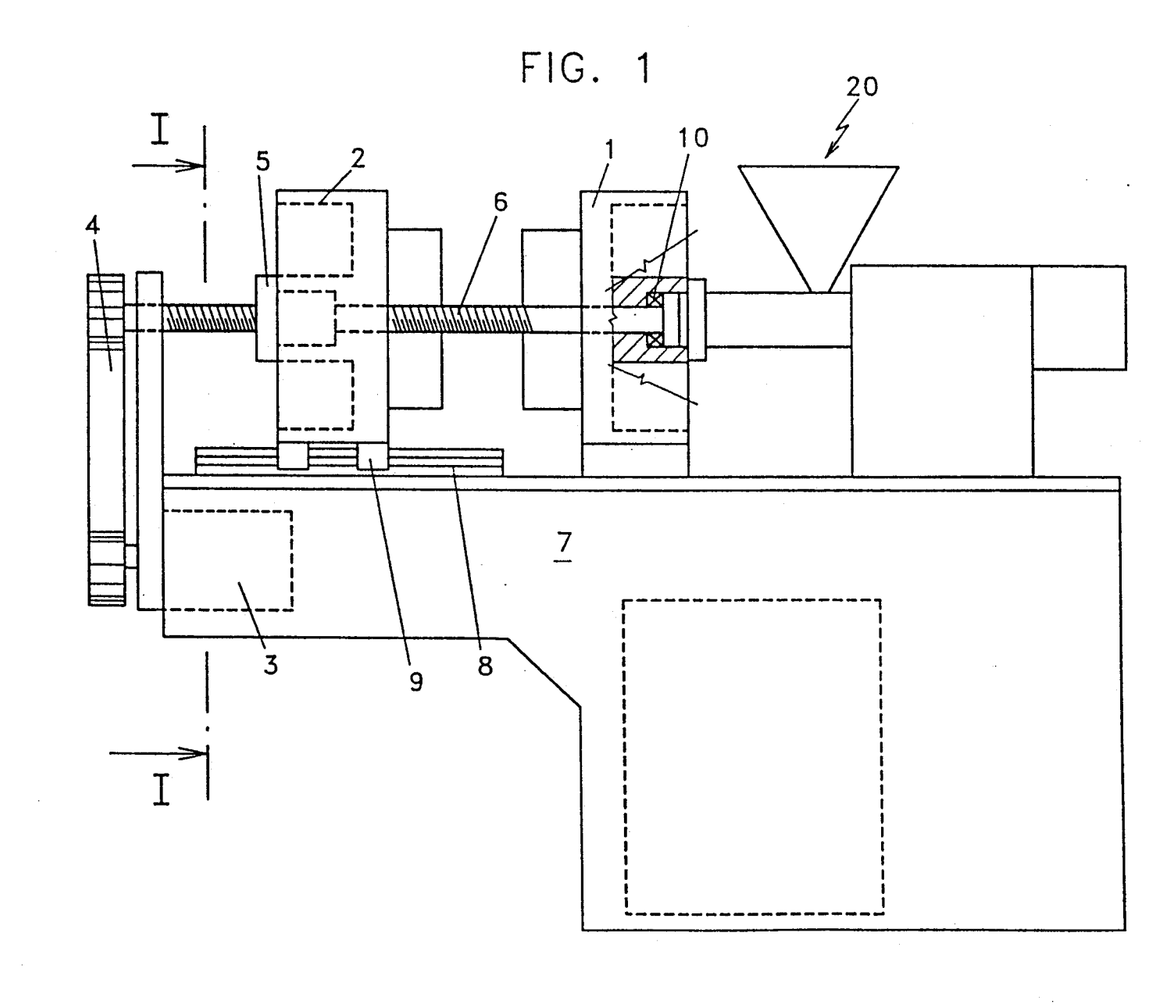
FIG. 1 is a side elevational view, partially in section, of the present invention.
Figure 2:
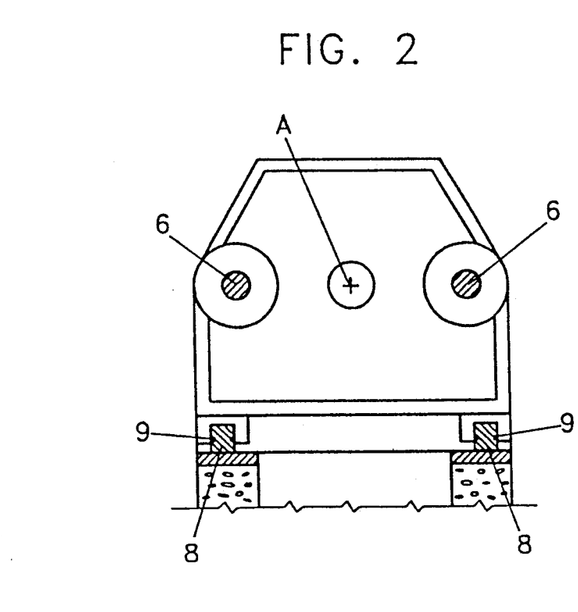
FIG. 2 is a cross-section of the device of FIG. 1 taken through line I—I.

FIG. 1 and 2 show on embodiment of a clamping unit of a mold injection machine according to the invention. The unit includes two mold plates which are shown as fixed mod clamping plate 1 and sliding mold clamping plate 2. Mold clamping plate 2 is driven by two ball spindles 6 which are, preferably, symmetrically arranged as shown.

Ball spindles 6 are driven by common hydraulic motor 3 for the synchronized and properly adjusted movement of mold clamping plate 2. Toothed belt 4 transfers the power or torque from hydraulic motor 3 to ball spindles 6. Mold clamping force is introduced from rotating nuts 5, which may take the form of threaded sleeve inserts, to mold clamping plate 2. The spindle-axil forces, as well as the maximum load condition, during the clamping force are absorbed or supported by bearing 10 of fixed mold clamping plate 1.

Mold clamp plate 1, with its enlarged bases, is mounted on rigid polymer concrete machine bed 7. Guide rails 8 are, also, mounted on bed 7. On the bottom side of mold clamping plate 2, four linear cradle guides 9 are attached to allow guide rail 8 to precisely guide, position and provide stability to mold clamping plates 1 and 2 even during excentric loads.

Ball spindle 6 is on the same plane as central longitudinal axis A of mold clamping plates 1 and 2 so that a specially advantageous power distribution, or application to mold clamping plates 1 and 2, is achieved.

Figure 3:
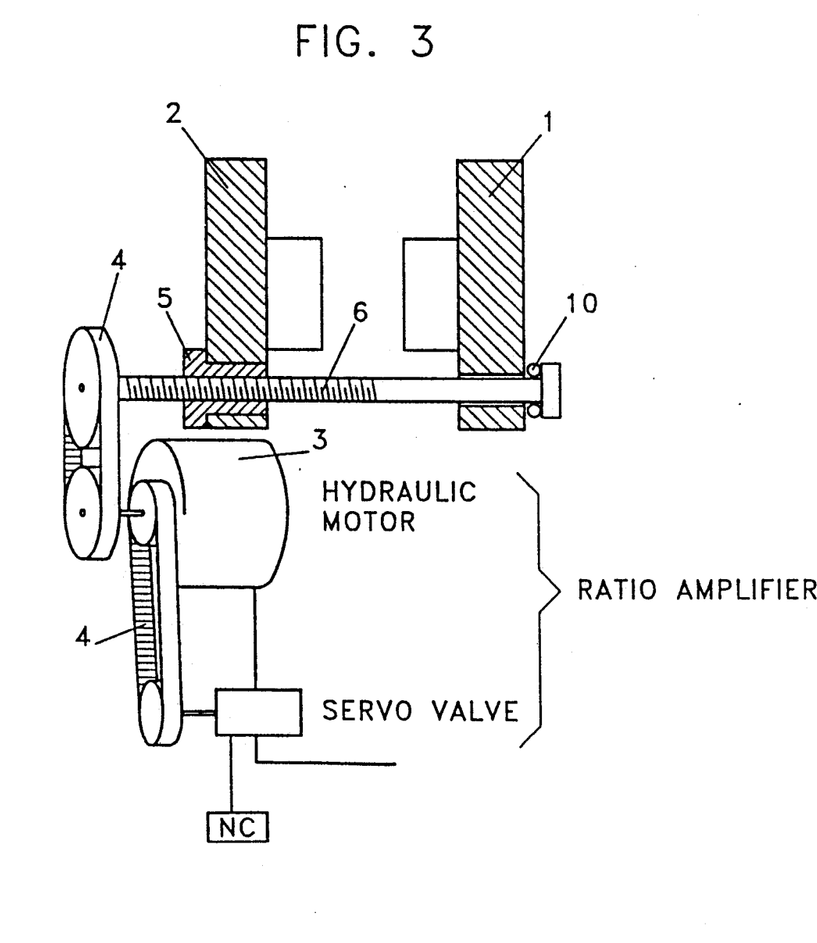
FIG. 3 is a perspective view of a motor drive system of the present invention.
Figure 4:
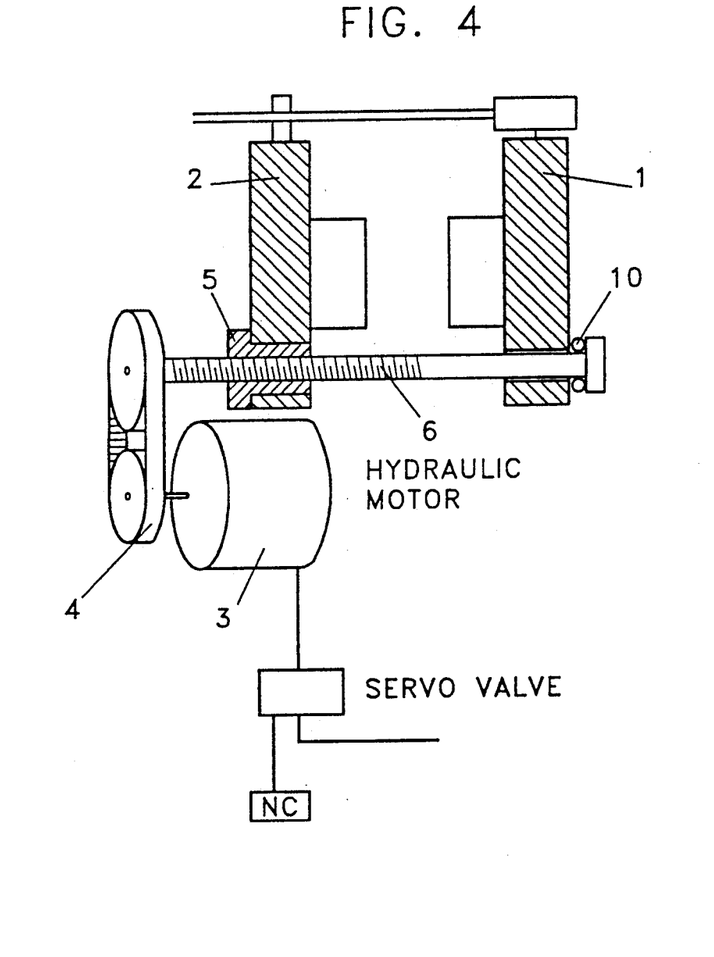
FIG. 4 is a perspective view of another motor drive system of the present invention.

In FIGS. 3 and 4, two transmissions for the hydraulic drives are shown. The illustrated drive transmissions have a shiftable or speed changeable hydraulic motor 3 with two choices of displacement of volume. One embodiment provides the combination of a constant hydraulic motor with a transmission to accommodate the various requirements of torque and rotational velocity relationship. During the initial drive movement, when mold clamping plates and 2 are being moved together, a larger rotational velocity is required than during the establishment of clamping pressure, when a smaller rotational velocity is required along with a high torque. This is achieved through appropriately chosen gear ratios of the transmission. One possible embodiment is a toothed belt integrated with a variable planetary gear.

Figure 5:
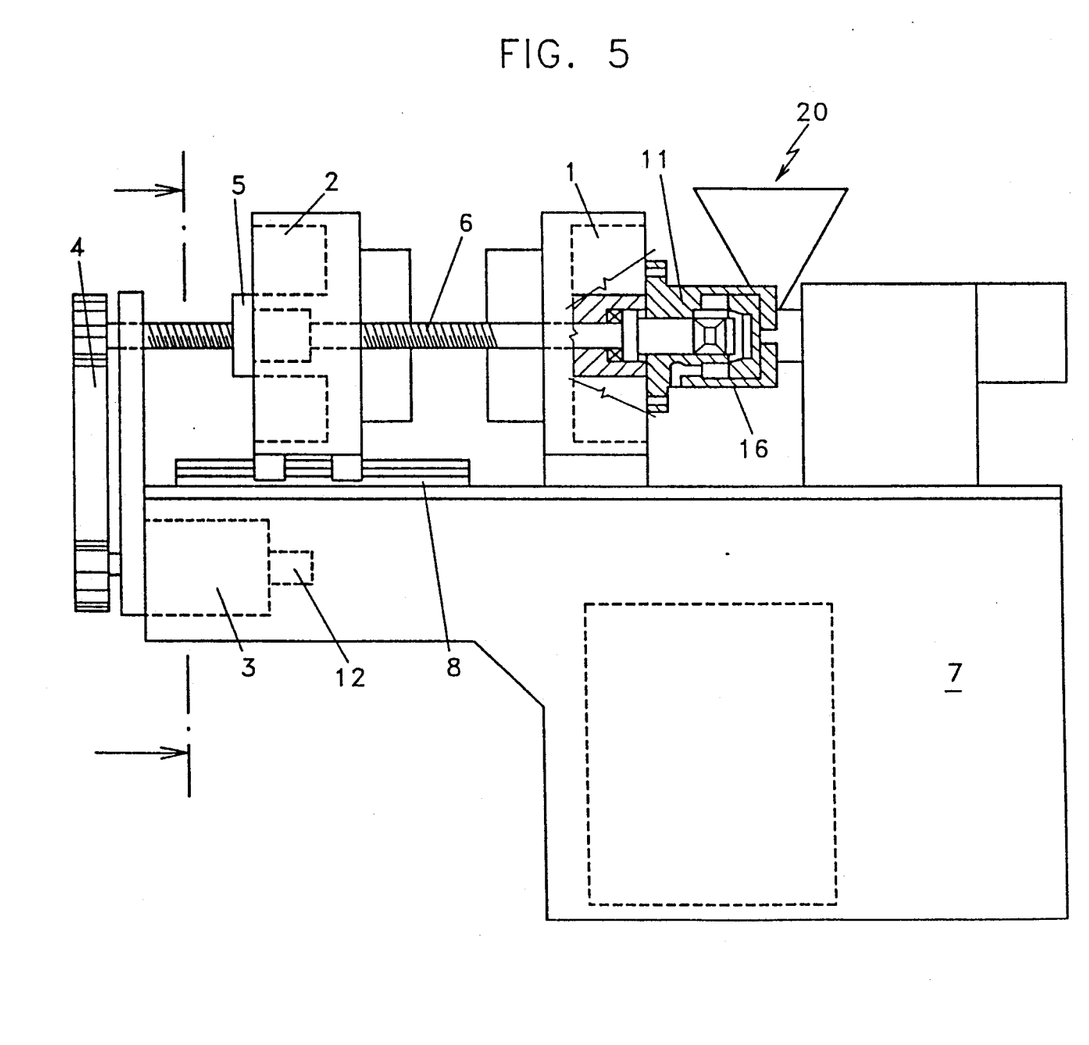
FIG. 5 is a side elevational view, partially in section, of another embodiment of the present invention.

FIG. 5 shows an embodiment of the invention whereby a division of power is incorporated between the establishment of clamping force and initial movement, when mold clamping plates 1 and 2 are being moved together. In this embodiment, hydraulic mechanical clamping unit 11 is mounted to the end of ball spindle 6 which, in turn, is attached to mold clamping plate 1. Mold clamping plates 1 and 2 are drawn together, initially, by ball spindle 6, which is powered by hydraulic motor 3. After mold clamping plates 1 and 2 are together, wedging element 16 is then employed to provide the necessary clamping force between clamp plates 1 and 2. Guide rails 8 are utilized only for the traveling motion force. The driving of ball spindle 6, by means of hydro-motor 3, is designed to be a single stage only for the travel motion of mold clamping plate 2. Brake 12 is provided for protection of the end of the travel stroke.

Figure 6:
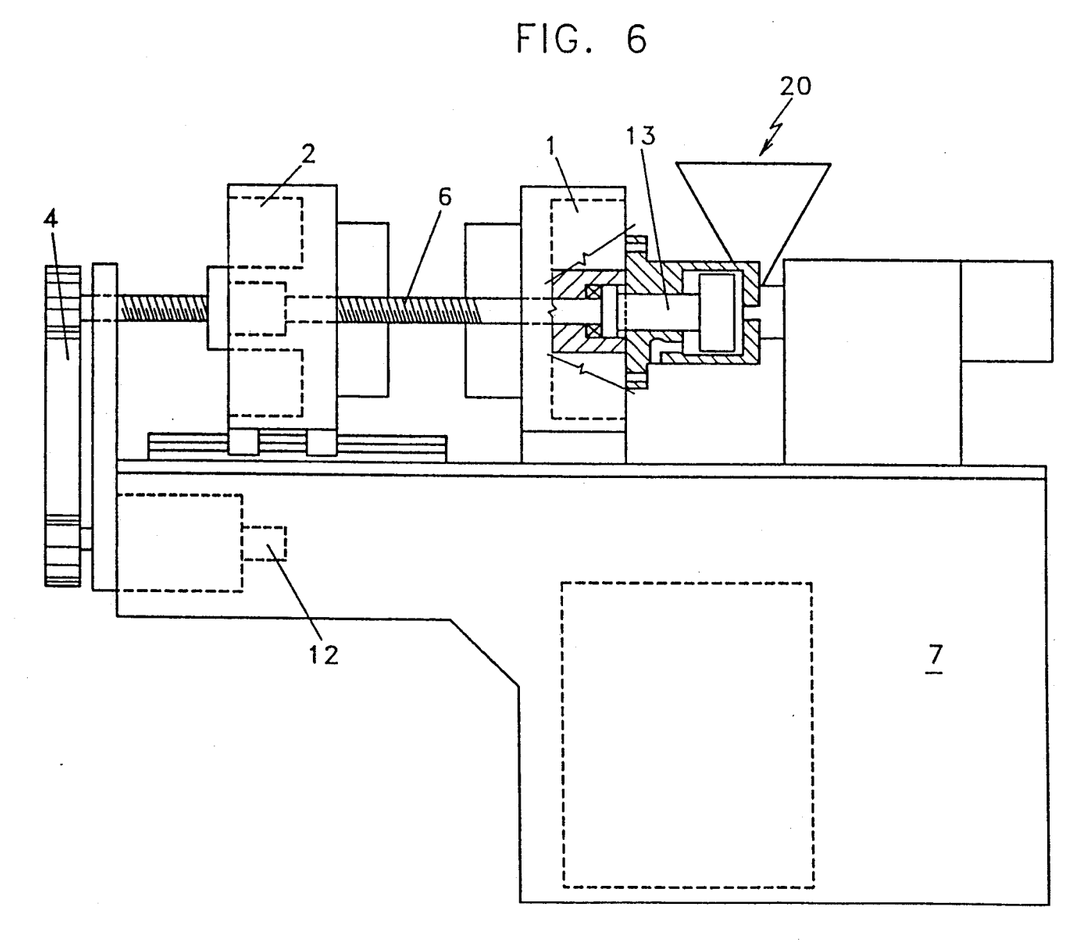
FIG. 6 is a side elevational view, partially in section, of another embodiment of the present invention.

FIG. 6 shows another embodiment of the present invention. The production of clamping force, after mold clamping plates 1 and 2 are drawn together by ball spindle 6, is implemented through hydraulic pressure operated piston and cylinder 13 which develops a pressure cushion. With this pressure cushion, it becomes possible to exercise an axial tension against ball spindle 6, whereby the blocking ball spindle rotation generates a clamping power on the mold clamping plates. This embodiment is similar to the one described in FIG. 5 with the difference being that, instead of a mechanical wedging element, the pressure cushion of a hydraulic unit is utilized. Here, again hydraulic motor 3 is singe staged and is equipped with brake 12.

Figure 7:
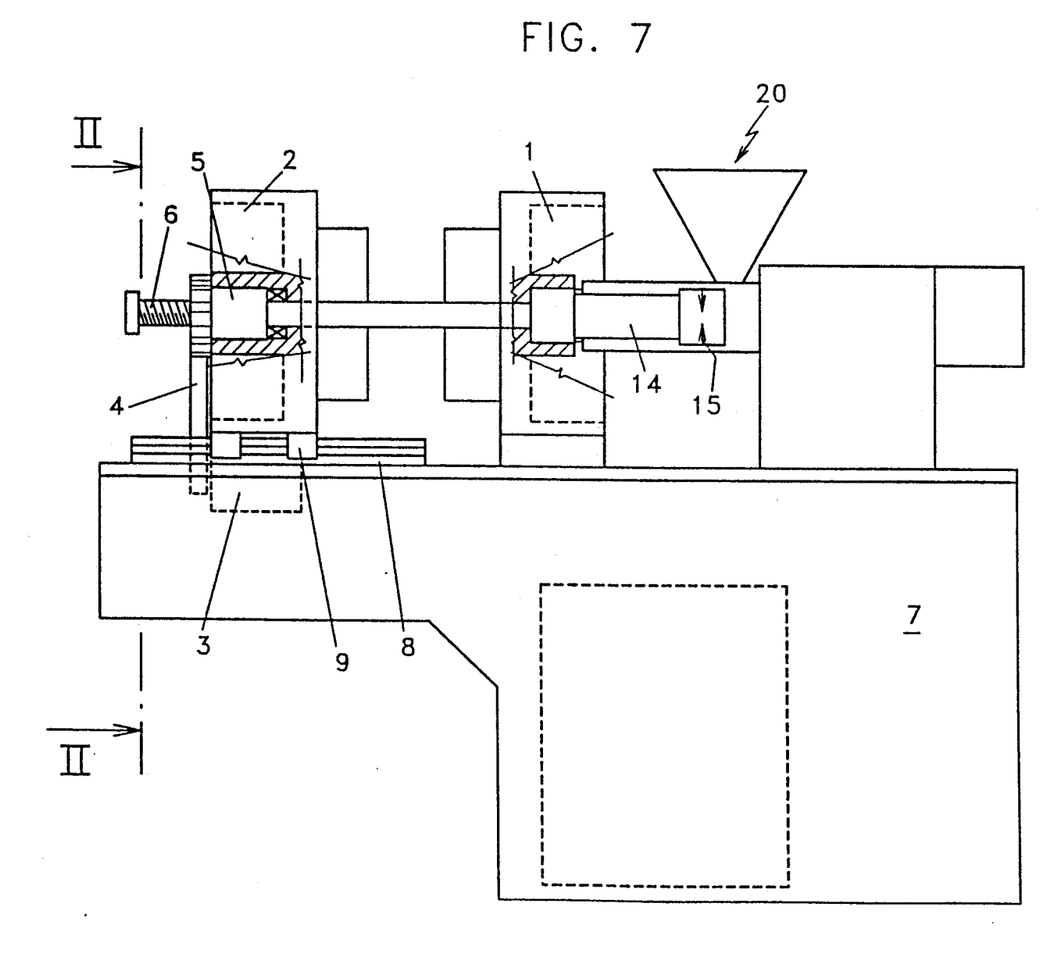
FIG. 7 is a side elevational view, partially in section, of another embodiment of the present invention.
Figure 8:
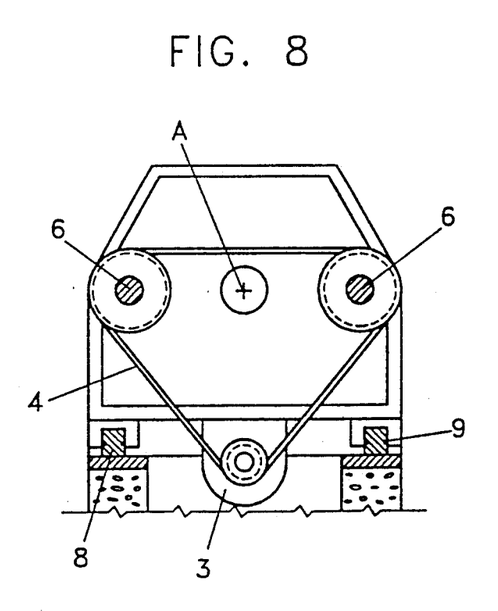
FIG. 8 is a cross-section of the device of FIG. 7 taken through line II—II.

In FIGS. 7 and 8, hydraulic drive cylinder 14 provides the initial drive or movement of mold clamping plate 2 instead of ball spindle 6. In the previously described embodiments, only limited linear speeds of mold clamping plate 2 could be obtained because of engineering technical limitations, which limit the rotational velocity of ball spindle 6. Drive cylinder 14 permits higher linear speeds of mold clamping plate 2. After blocking of drive cylinder 14 by locking apparatus 15 at the end of the drive stroke, the buildup of clamping power is implemented by ball spindle 6. Both rotating nuts, or threaded sleeve inserts, are moved by hydraulic motor 3 and synchronized together. Hydraulic motor 3 delivers its torque by toothed belt 4. The clamping force is introduced by two rotating nuts 5, or threaded sleeve inserts, which are mounted in mold clamping plate 2. In all embodiments, hopper 20 is provided for receiving the material to be molded in the clamped mold clamping plates 1 and 2.

Patents relating to chain drives and mod systems include U.S. Pat. No. 4,527,611, entitled "Permanent Mold Casting Systems;" U.S. Pat. No. 4,518,338, entitled "Injection Molding Machine With Mold Changing And Mold Preconditioning Device;" U.S. Pat. No. 4,462,783, entitled "Mechanism For Exchanging Molding Dies In An Injection Molding Machine" and U.S. Pat. No. 3,966,184, entitled "Die-Testing Press."

Patents relating to wedging devices include U.S. Pat. No. 4,174,916, entitled "Forming Tool Construction" and U.S. Pat. No 4,104,937, entitled "Pipe Cleaning Brush Assembly For Pipe Facing Machine."

Patents relating to hydraulic motors include U.S. Pat. No. 4,811,649, entitled "Hydraulic Control Apparatus;" U.S. Pat. No. 4,669,225, entitled "Device For Driving A Body That Performs A Tumbling And Rotating Movement;" U.S. Pat. No. 4,464,898, entitled "Hydraulic Power System;" U.S. Pat. No. 4,395,878, entitled "Control System For Hydraulically Driven Vehicle;" U.S. Pat. No. 4,343,513, entitled "Method And Power Transmission System For Operating A Road Planar Machine;" U.S. Pat. No. 4,098,433, entitled "Hydraulic System For Broadcast Spreader;" U.S. Pat. No. 4,077,212, entitled "Hydrostatic Transmission Control;" U.S. Pat. No. 4,845,961, entitled "Hydraulically Operated Continuously Variable Transmission" and U.S. Pat. No. 3,966,367, entitled "Hydraulic Motor Or Pump With Movable Wedge."

Patents relating to ball spindles include U.S. Pat. No. 4,705,437, entitled "Reversible Dual Speed Tapping Attachment;" U.S. Pat. No. 4,401,177, entitled "Sliding Weight Scale;" U.S. Pat. No. 4,357,838, entitled "Ball Screw And Nut Drive Device;" U.S. Pat. No. 4,245,791, entitled "Device For Mounting The Braking Cone Of An Inertia Crusher;" U.S. Pat. No. 4,073,446, entitled "Inertia Cone Crusher" and U.S. Pat. No. 3,965,701 entitled "Constant Velocity Universal Joints."

Patents relating to polymers include U.S. Pat. No. 4,731,427, entitled, "Method for the Preparation of Rigid Reaction Injection Molded Thermoset Polyurethane Modified Polyisocyanurate Compositions;" U.S Pat. No. 4,709,002, entitled "Method for the Preparation of Rigid Non-Cellular Reaction Injection Molded Thermoset Polyisocyanurate Compositions" and U.S. Pat. No. 4,673,722, entitled, "High Impact Nylon/-Polyurea Copolymer."

In summation, one aspect of the invention resides broadly in a precision clamping unit for an injection molding machine with a machine bed 7 on which are arranged a stationary and a slidingly guided mold clamping plate 2 as well as at east one hydraulic drive 3 for moving and/or locking of the mold clamping plate 2. It is characterized by the combination of the following features, some of them already known:
  a) The adjustable mold clamping plate 2 on its footing side is guided on a precision linear guide 8 which is securely mounted in a torsion resistant manner on machine bed 7.
  b) Two parallel ball spindles 6 are arranged symmetrically in a horizontal plane on either side of the central axis A of mold clamping plate 2 and driven synchronously by a motor. By means of the ball spindle 6 the sliding mod clamping unit 2 can be displaced and/or clamping force can be applied, and which mold clamping unit is in a common plane with central axis A.
  c) Hydraulic drive unit 3 is provided for the movement or locking of the sliding mold clamping plate 2 and is directly connected by rotary motion to the ball spindle 6.

Another aspect of the invention resides broadly in a precision clamping unit characterized by the fact that the precision linear guide rail 8 is formed into a linear cradle guide whereby the mounting area of the movable mold clamping plate 2 where four linear cradle elements 9 are provided in the corresponding width of support.

Yet another aspect of the invention resides broadly in a precision clamping unit characterized by the fact that precision linear guide rail 8 is mounted onto machine bed 7 and which machine bed consists of polymer concrete.

A further aspect of the invention resides broadly in a precision clamping unit characterized by the fact that hydraulic motor 3 can be reversed or switched for at least two displacement volumes.

A yet further aspect of the invention resides broadly in a precision clamping unit characterized by the fact that hydraulic motor 3 has an attached mechanical switching gear with which at least two torques/revolutions per minute ratio combinations can be obtained.

Yet another further aspect of the invention resides broadly in a precision clamping unit characterized by the fact that the switching gear is developed as an integated planetary gear into the drive line of ball spindle 6.

An additional aspect of the invention resides broadly in a precision clamping unit characterized by the fact that the control of the hydraulic motor 3 a servo-valve with a closed control circuit is provided and a four-quadrant-operation is intended.

A yet additional aspect of the invention resides broadly in a precision clamping unit characterized by the fact that a stepping motor controlled servo-valve (hydraulic ratio amplifier) is provided for the control of the hydraulic motor 3.

A further additional aspect of the invention resides broadly in a precision clamping unit characterized by the fact that hydraulic motor 3 is the sole travel drive for the sliding mod clamping plate 2, and it is developed into a continuous use motor with brake 12 and that, for the locking for the moveable mold clamping plate 2 opposite of the fixed mold clamping unit 1, hydraulic and/or hydraulically operated locking elements 11 are provided.

A yet further additional aspect of the invention resides broadly in a precision clamping unit characterized by the fact that there is hydromechanical clamping element 11 which is mounted on the fixed mold clamping plate 1 and is attached to each ball spindle end. With the assistance of a wedging effect 16 and axial clamping force can be hydraulically applied against the ball spindle 6 which is secured against rotations.

Another further additional aspect of the invention resides in a precision clamping unit characterized by the fact that there is a piston-cylinder-unit 13 integrated on each end with the ball spindles 6 with which, during blocked spindle rotation, the clamping force of both clamping units 1 and 2 can be generated.

A yet another additional aspect of the invention resides broadly in a precision clamping unit characterized by the fact that the ball spindle 6, for the purpose of application of closing force at the mold clamping unit, corresponds to one each of the rotating nuts or threaded sleeve inserts 5, attached to the sliding mold clamping unit 2 which can be driven in a synchronized manner by a common hydraulic motor 3. For the locking movement of mod clamping unit, piston-cylinder-unit 14 is provided which sweeps over the entire drive stroke and which can be mechanically form locked by apparatus 15.

All of the patents, patent applications and publications recited herein are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

We claim:

1. An injection molding machine having bed means on which is disposed an apparatus for moving together and separating first and second injection mold pieces, said first and second injection mold pieces having a mutually central axis along which said moving together and separating first and second injection mold pieces occurs, said central axis passing substantially through a central portion of said first and second injection mold pieces, said apparatus comprising:
    first and second guide rail means, disposed on said bed means, said first and second guide rail means movably supporting at least one of said first and second injection mold pieces, each said guide rail means defining its longitudinal axis;
    said longitudinal axis of said first guide rail means being disposed generally parallel to said longitudinal axis of said second guide rail means;
    first and second ball spindle drives mechanically connected to said at least one of said first and second injection mold pieces for moving said at least one of said first and second injection mold pieces toward and away form the other of said first and second injection mold pieces;
    said at least movable one of said first and second injection mold pieces being supported by said first and second guide rail means;
    said first and second guide rail means being firmly attached to said bed means a substantial distance form one anther to provide linear guidance and torsion resistance for said at least movable one of said first and second injection mold pieces;
    said first and said second ball spindle drives for being disposed a distance from one another, one on either side and symmetrically with respect to said central axis of said fist and second injection mold pieces, said first and second ball spindle drives being substantially parallel to said central axis, said first and second ball spindle drives defining a horizontal plane;
    means for operating said first and second ball spindle drives synchronously with one other;
    cradle means for movably supporting said first injection mold piece on said first and second guide rail means, said cradle means comprising a generally U-shaped cradle element having an interior cavity, the interior cavity for being disposed about said guide rail means; and
    said first ball spindle drive being positioned generally vertically above said first guide rail means and said second ball spindle drive being positioned generally vertically above said second guide rail means so that the distance form said first guide rail means to said second guide rail means is substantially equal to the distance from said first ball spindle drive to said second ball spindle drive.

2. The machine of claim 1, wherein said means for operating said ball spindle drive is a hydraulic motor means.

3. The machine of claim 2, wherein:
    each said ball spindle drives defines a longitudinal axis; and
    said longitudinal axis of said first and second guide rail means and said longitudinal axis of said ball spindle drives are all generally parallel to one another.

4. The machine of claim 3, wherein said bed means is constructed of concrete.

5. The machine of claim 3, wherein:
    said first injection mold piece is supported by said first and second guide rail means; and
    said second injection mold piece is supported by said bed means.

6. The machine of claim 5, further including clamp means for detachably clamping said first and second injection mold pieces together after said ball spindle drives has moved said first injection mold piece toward said second injection mold piece.

7. The machine of claim 6, wherein said clamp means comprises wedge means.

8. The machine of claim 6, wherein said clamp means comprises piston and cylinder means.

9. The machine of claim 5, further including linear drive means for providing initial movement of said first injection old piece toward said second injection mold piece.

10. The machine of claim 9, wherein said first and second ball spindle drives comprise lock means for locking said linear drive means after said linear drive means has completed said initial movement to move said first injection mold piece toward said second injection mold piece.

11. The machine of claim 1, wherein said cradle means comprises at least four cradle elements.

12. The machine of claim 1, wherein said first ball spindle drive is positioned generally vertically above said first guide rail means and said second ball spindle drive is positioned generally vertically above said second guide rail means so that the distance from said first guide rail means to said second guide rail means is substantially equal to the distance form said first ball spindle drive to said second ball spindle drive.

* * * * *

UNITED STATES PATENT AND TRADEMARK OFFICE
CERTIFICATE OF CORRECTION

PATENT NO. : 5,110,283
DATED : May 5, 1992
INVENTOR(S) : Hans BLÜML, Peter KLEIN and Ernst WÜRL It is certified that error appears in the above-indentified patent and that said Letters Patent is hereby corrected as shown below:

In column 1, line 18, after 'guided', delete "mod" and insert --mold--.

In column 2, line 44, after 'a', delete "clogged" and insert --cogged--.

In column 2, line 45, after 'the', delete "clogged" and insert --cogged--.

In column 3, line 66, after 'show', delete "on" and insert --one--.

In column 5, line 3, after the second occurrence of 'is', delete "singe" and insert --single--.

In column 5, line 24, after 'and', delete "mod" and insert --mold--.

In column 6, line 7, after 'at', delete "east" and insert --least--.

UNITED STATES PATENT AND TRADEMARK OFFICE
CERTIFICATE OF CORRECTION

PATENT NO. : 5,110,283

DATED : May 5, 1992

INVENTOR(S) : Hans BLÜML, Peter KLEIN and Ernst WÜRL

Page 2 of 3

It is certified that error appears in the above-indentified patent and that said Letters Patent is hereby corrected as shown below:

In column 6, line 65, after 'sliding', delete "mod" and insert --mold--.

In column 7, line 24, after 'of', delete "mod" and insert --mold--.

In column 7, line 57, Claim 1, after 'away', delete "form" and insert --from--.

In column 7, line 64, Claim 1, delete "form" and insert --from--.

In column 7, line 64, Claim 1, after 'one', delete "anther" and insert --another--.

In column 8, line 2, after 'said', delete "fist" and insert --first--.

UNITED STATES PATENT AND TRADEMARK OFFICE
CERTIFICATE OF CORRECTION

PATENT NO. : 5,110,283
DATED : May 5, 1992
INVENTOR(S) : Hans BLÜML, Peter KLEIN and Ernst WÜRL It is certified that error appears in the above-indentified patent and that said Letters Patent is hereby corrected as shown below:

In column 8, line 24, Claim 2, after 'spindle', delete "drive" and insert --drives--.

In column 8, line 66, Claim 12, after 'distance', delete "form" and insert --from--.

Signed and Sealed this

Second Day of August, 1994

Attest:

BRUCE LEHMAN

*Attesting Officer*     *Commissioner of Patents and Trademarks*